United States Patent
Tatsumi

(10) Patent No.: US 6,246,494 B1
(45) Date of Patent: Jun. 12, 2001

(54) IMAGE READING APPARATUS

(75) Inventor: Setsuji Tatsumi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/044,680

(22) Filed: Mar. 19, 1998

(30) Foreign Application Priority Data

Mar. 19, 1997 (JP) .................................................. 9-065711

(51) Int. Cl.$^7$ ...................................................... G03F 3/08
(52) U.S. Cl. ........................... 358/522; 358/506; 358/518
(58) Field of Search ..................................... 358/518, 522, 358/506, 504, 487, 523, 406; 382/167, 168; 399/52; 355/38, 35, 77; 430/30; 348/577

(56) References Cited

U.S. PATENT DOCUMENTS

| 4,884,102 | * | 11/1989 | Terashita | 355/38 |
| 5,353,095 | * | 10/1994 | Terashita | 355/38 |
| 5,365,353 | * | 11/1994 | Kraft | 358/518 |
| 5,703,672 | * | 12/1997 | Terashita | 355/38 |
| 5,876,876 | * | 3/1999 | Otake | 430/30 |
| 5,949,962 | * | 9/1999 | Suzuki et al. | 348/577 |

* cited by examiner

Primary Examiner—Cheukfan Lee

(57) ABSTRACT

The present invention includes a digital image reading apparatus and method which can determine the characteristic value of film with pinpoint accuracy and can properly determine the image processing conditions for each frame using the characteristic value even if the images recorded on the film have color failure. The present invention provides an image reading apparatus which comprises a reader for photoelectrically reading the images recorded on a film and outputting the images as image data; a condition setter for creating the density histograms of the images of each frame read by the reader, calculating the characteristic value of the film from the density histograms of a plurality of frames and determining the image processing conditions for an image of each frame from the characteristic value of the film and the image data of the images of each frame, wherein the characteristic value of the film is calculated by approximating a relationship among the three primary colors of a specific point on a side where a cumulative frequency is low and a specific point on the side where the cumulative frequency is high which are obtained from the density histograms of the images of the respective frames by means of a method of least squares. It is preferable that the condition setter calculates the characteristic value of the film using the maximum density and the minimum density obtained from the density histograms of the respective frames.

18 Claims, 3 Drawing Sheets

IMAGE READING APPARATUS

BACKGROUND OF THE INVENTION

The present invention relates in the technical field of an image reading apparatus which is used to digital photoprinters and the like to photoelectrically read an image recorded on a film and output the image as recording image data by subjecting the image to specific image processing.

Images recorded on photographic films (hereinafter, referred to as films) such as a negative film, a reversal film and the like are conventionally printed onto light-sensitive materials (photographic papers) by so-called direct exposure, that is, a method in which an image carried by a film is projected onto the light-sensitive material for exposure.

In contrast, recently, printers making use of digital exposure, have become commercially practical that is, digital photoprinters which photoelectrically read an image recorded on a film, convert the thus read image into a digital signal and thereafter apply various steps of image processing to the digital signal to thereby provide recording image data, record the image (latent image) on a light-sensitive material by scan exposing it with recording light which is modulated in accordance with the image data, and produce a print.

In digital photoprinters, exposure conditions are determined by photoelectrically reading the film and carrying out gradation correction and the like by image (signal) processing. As a result, the digital photoprinters can freely perform an editing job for print images such as composition of a plurality of images to a composite image, division of a single image into segments by processing the images and various types of image processing such as color/density adjustments, edge enhancement and the like and output prints which are freely processed in accordance with a specific use. Further, the image data of a printed image can be supplied to computers and the like and saved in recording mediums such as a floppy disc and the like.

In addition, the digital photoprinters can output a print which has better image quality and has better resolution, color/density reproducibility and the like as compared with a print produced by conventionally direct exposure.

The digital photoprinters essentially comprise an image reading apparatus (input apparatus) which is composed of a scanner for photoelectrically reading an image recorded on a film and converting it into image data and an image processing device for processing the image data (subjecting it to image processing) to thereby determine exposure conditions, namely, making the image data to recording image data and a printer (output device) for scan exposing a photosensitive material in accordance with the recording image data, subjecting it to development processing and outputting the image data as a print.

In the scanner, the reading light emitted from a light source is applied to the film so as to obtain projecting light which carries the image recorded on the film, the projecting light is projected onto an image sensor such as a CCD sensor or the like at a sufficiently focused position by an imaging lens to read the image photoelectrically. The image is then subjected to various types of image processing, when necessary, and thereafter supplied to the image processing device as the image data (image data signal) of the film. In the scanner, the film is fed frame by frame by a carrier mounted thereon so that the images recorded to the respective frames of the film are successively read one by one.

The image processing device sets the image processing conditions from the thus obtained image data, subjects the image data to image processing in accordance with the set image processing conditions and supplies the image data to the printer as processed recording image data (exposure conditions).

In the printer, in the case of an apparatus making use of light beam scanning exposure, for example, light beams are modulated in accordance with the image data supplied from the image processing device and deflected in a main scanning direction. Also, a photosensitive material is conveyed in an auxiliary scanning direction which is normal the main scanning direction. In this manner, the photosensitive material is exposed to (or printed by) the light beams carrying an image to thereby form a latent image. The photosensitive material is then subjected to development processing and the like in accordance with the nature of the photosensitive material. A print (photograph) reproducing the image recorded on the film is thereby obtained.

When the image is read by the photoprinters as described above, the image processing conditions are ordinarily determined from the prescanned image data which is obtained by roughly reading the image recorded on the film and finely scanned image data is processed in accordance with the image processing conditions and output to the printer as the recording image data.

Further, conventional photoprinters employing direct exposure also read an image recorded on a film by an image sensor before the image is printed on a photosensitive material and determine exposure conditions such as an amount of insertion of a color filter in exposure, the stop value of the quantity of light, and the like from the image data of the image.

However, in the above reading of the image, since the characteristic value (base density) of a negative film is reflected to the image data, there may be a situation where proper image processing conditions (namely, exposure conditions) corresponding to the image recorded on a film cannot be determined and a resulting print is improperly made.

To deal with this problem, the direct-exposure type photoprinters effect printing after they read the images of a plurality of frames, for example, the images of all the frames by the image sensor, calculate the characteristic value of the negative film from the image data of all the frames and determine the exposure conditions for each frame using the characteristic value of the negative film and the image information of each frame.

The characteristic value of the negative film is generally determined using the average density value of an image which is liable to be affected by so-called color failure. Thus, the method using the average density value cannot determine the characteristic value of the negative film with pinpoint accuracy and cannot determine preferable image processing conditions in many cases.

In addition, the effect applied to the characteristic value of the negative film by the exceptional value of a frame with failure is reduced by means of the image data of a plurality of frames. However, since ordinary photographs have a plurality of successive frames where similar images (scenes) are recorded, when these frames have failure, the characteristic value of the negative film cannot be also determined with pinpoint accuracy.

SUMMARY OF THE INVENTION

An object of the present invention for solving the problems of the prior art is to provide a digital image reading apparatus and method for photoelectrically reading an image recorded on a film and outputting the image as recording image data by subjecting the image to specific image processing wherein the digital image reading apparatus is arranged such that when the characteristic value of a negative film is determined from the image data of a plurality of frames, the apparatus can determine the characteristic value of the negative film with pinpoint accuracy and can properly determine the image processing conditions for each frame using the characteristic value even if the images recorded on the film have color failure.

To achieve the above object, the present invention includes an image reading apparatus which comprises reading means for photoelectrically reading the images recorded on a film and outputting the images as image data; condition setting means for creating the density histogram of the image of each frame read by the reading means, calculating the characteristic value of the film from the density histograms of a plurality of frames and determining the image processing conditions for each frame from the characteristic value of the film and the image data of each frame; and image processing means for processing the image data of each frame in accordance with the image processing conditions determined by the condition setting means.

It is preferable that the condition setting means calculates the characteristic value of the film using the maximum density and the minimum density obtained from the density histograms of the respective frames.

DETAILED DESCRIPTION OF THE INVENTION

An image reading apparatus of the present invention will be described below in detail with reference to a preferred embodiment shown in the accompanying drawings.

Figure 1:
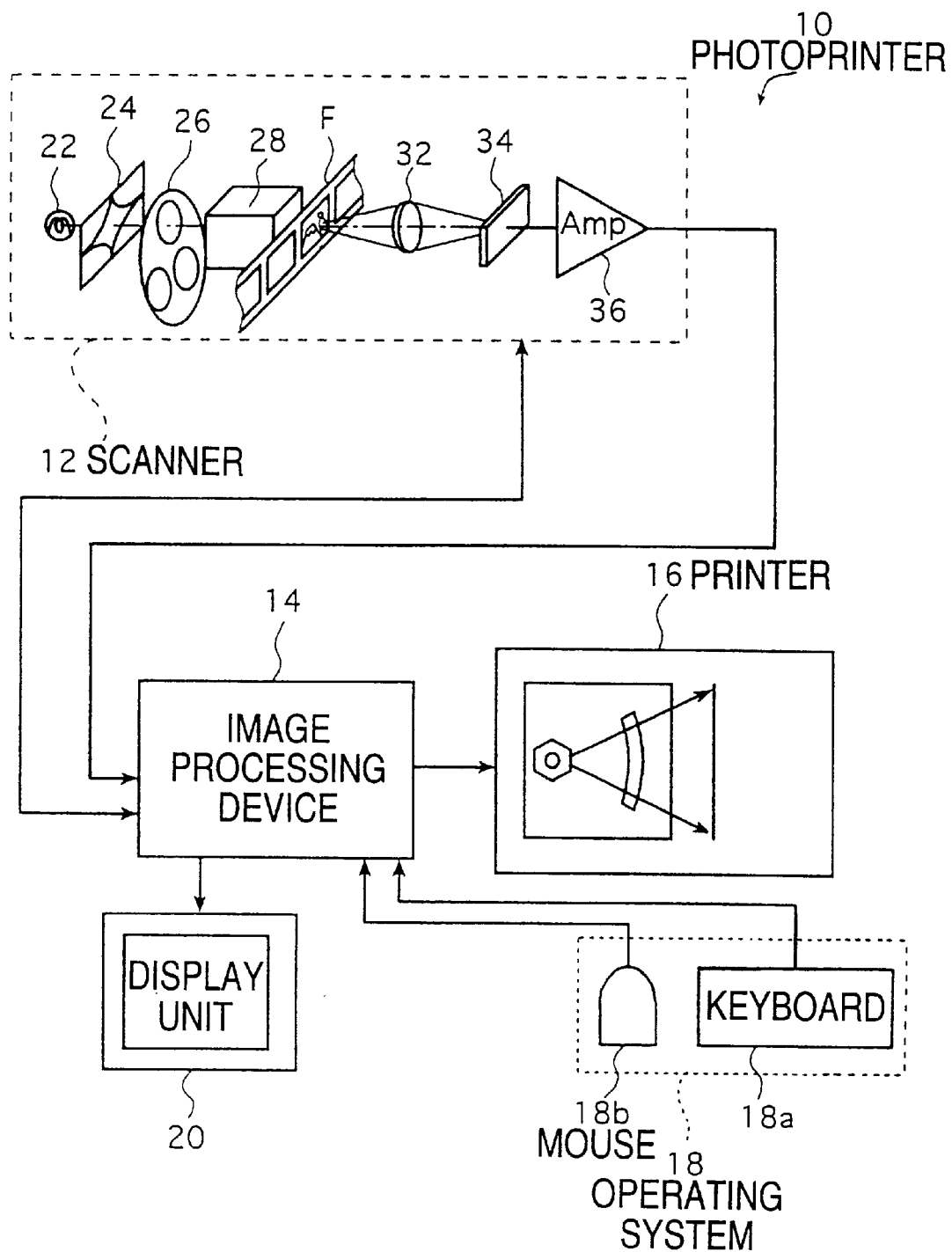
FIG. 1 is a block diagram showing an example of a digital photoprinter using an image reading apparatus of the present invention.

FIG. 1 is a block diagram showing an example of a digital photoprinter using an image reading apparatus of the present invention.

The digital photoprinter (hereinafter, referred to as a photoprinter 10) shown in FIG. 1 essentially comprises a scanner 12 for photoelectrically reading an image recorded on a film F, an image processing device 14 (hereinafter, referred to as a processing device 14) for subjecting the image data (image information) read by the scanner 12 to image processing and making it record image data and a printer 16 for exposing a photosensitive material with light beams modulated in accordance with the image data processed by the processing device 14, subjecting the photosensitive material to development processing and outputting the image data as a print. The image reading apparatus (input apparatus) of the present invention comprises the scanner 12 and the processing device 14.

Connected to the processing device 14 are an operating system 18 including a keyboard 18a and a mouse 18b for inputting (setting) various conditions, the indication and selection of various steps of processing, the indication of correction of colors and density and the like and a display unit 20 for displaying the image read by the scanner 12, the indication of various kinds of operation, various conditions set and registered images and the like.

The scanner 12 is a device for photoelectrically reading the images recorded on the respective frames of the film F one by one and comprises a light source 22, a variable stop 24 for adjusting the quantity of reading light in accordance with the images recorded on the film F, a color filter plate 26 which includes three filters, namely a red (R) filter, a green (G) filter and a blue (B) filter for separating an image into the three primary colors red (R), green (G) and blue (B) and rotates to actuate an arbitrary filter to a light passage, a diffusion box 28 for making the reading light incident on the film F uniform in the plane direction thereof, an imaging lens unit 32, a CCD sensor 34 as an area sensor for reading the image of a frame of the film and an amplifier 36.

Dedicated carriers are prepared for the scanner 12 of the photoprinter 10 of the illustrated example which can be mounted on the main body of the scanner 12 in accordance with the types of films that should be used in an advanced photo system, such as a 135-sized negative film, etc., the forms of films such as a strip, a slide, etc. the types of processing such as trimming, etc. and the like and the various types of the films can be handled and various steps of processing can be carried out by the replacement of the carriers.

The respective frames (images) of the film F are conveyed by the carrier one by one so as to be successively located at a specific reading position. The scanner 12 successively reads the images of the frames one by one.

In the scanner 12 described above, the reading light, which is emitted from the light source 22 with its quantity of light adjusted by the variable stop 24 and its color adjusted when it passes through the color filter plate 26 and then diffused by the diffusion box 28, is incident on the film F and passes therethrough. Thus, there is obtained projecting light which carries the images of the frames recorded on the film F.

The projecting light of the film F is projected onto the light receiving plane of the CCD sensor 34 in a sufficiently focused position by the imaging lens unit 32, photoelectrically read by the CCD sensor 34 and the signal output from the CCD sensor 34 is amplified by the amplifier 36 and supplied to the processing device 14.

The CCD sensor 34 is an area CCD sensor having, for example, 1380×920 pixels. In the apparatus of the illustrated example, the CCD sensor 34 is arranged so that it is two-dimensionally movable by an amount corresponding to one half a pixel in the direction where pixels are disposed, by which the number of reading pixels can be apparently increased up to four times.

The scanner 12 finely reads the image recorded on one frame of the film F by separating the image into the three primary colors R, G, B by reading the image three times by successively inserting the respective color filters of the color filter plate 26.

The scanner 12 of the illustrated example successively reads the images of the specific number of frames, for example, six frames.

Although described later, the apparatus of the illustrated example determines image processing conditions by thinning out the image data obtained by reading the image for obtaining the recording image data (hereinafter, referred to as the reading of the image to be output) without carrying out prescanning for determining the image processing conditions contrary to ordinary apparatuses as a preferable fashion which can execute operation promptly and efficiently. Here, prescanning reads images with pixel density or resolution which is lower than that read by fine scanning, but with which image processing conditions and reading conditions can be determined.

However, the present invention is not limited to the above arrangement and may determine the image processing conditions by carrying out the prescanning.

Images are not always properly recorded on the film F and in particular on the negative film and the images of many frames may be under-exposed or over-exposed and the density of an under-exposed image is greatly different from that of an over-exposed frame. Since reading conditions must be set such that the CCD sensor 34 is sensitive to a maximum density which is conceivable in all the images as well as the output therefrom is not saturated even if an image has a minimum density to read the images having a different density, an S/N ratio in reading and gradation resolution are greatly lowered.

To deal with this problem, in a preferable fashion, the photoprinter 10 executes previous reading for roughly reading an image prior to the reading of an image to be output and determines and adjusts the reading conditions of the image to be output, specifically, the stop value of the variable stop 24 and/or the accumulating time of the CCD sensor 34 in accordance with the result of the previous reading so as to optimize the reading conditions for each frame.

Although the apparatus of the illustrated example executes the previous reading using the CCD sensor 34 prior to the reading of the image to be output, a different sensor may be provided for the previous reading. However, the previous reading does not require pinpoint accuracy and high resolution as compared with those required by the prescanning for determining the image processing conditions, and the like.

When the prescanning is carried out to determine the image processing conditions, it suffices only to determine the reading conditions for reading the image to be output from the prescanned image data.

As described above, the output signal (image data) from the scanner 12 is supplied to the processing device 14.

Figure 2:
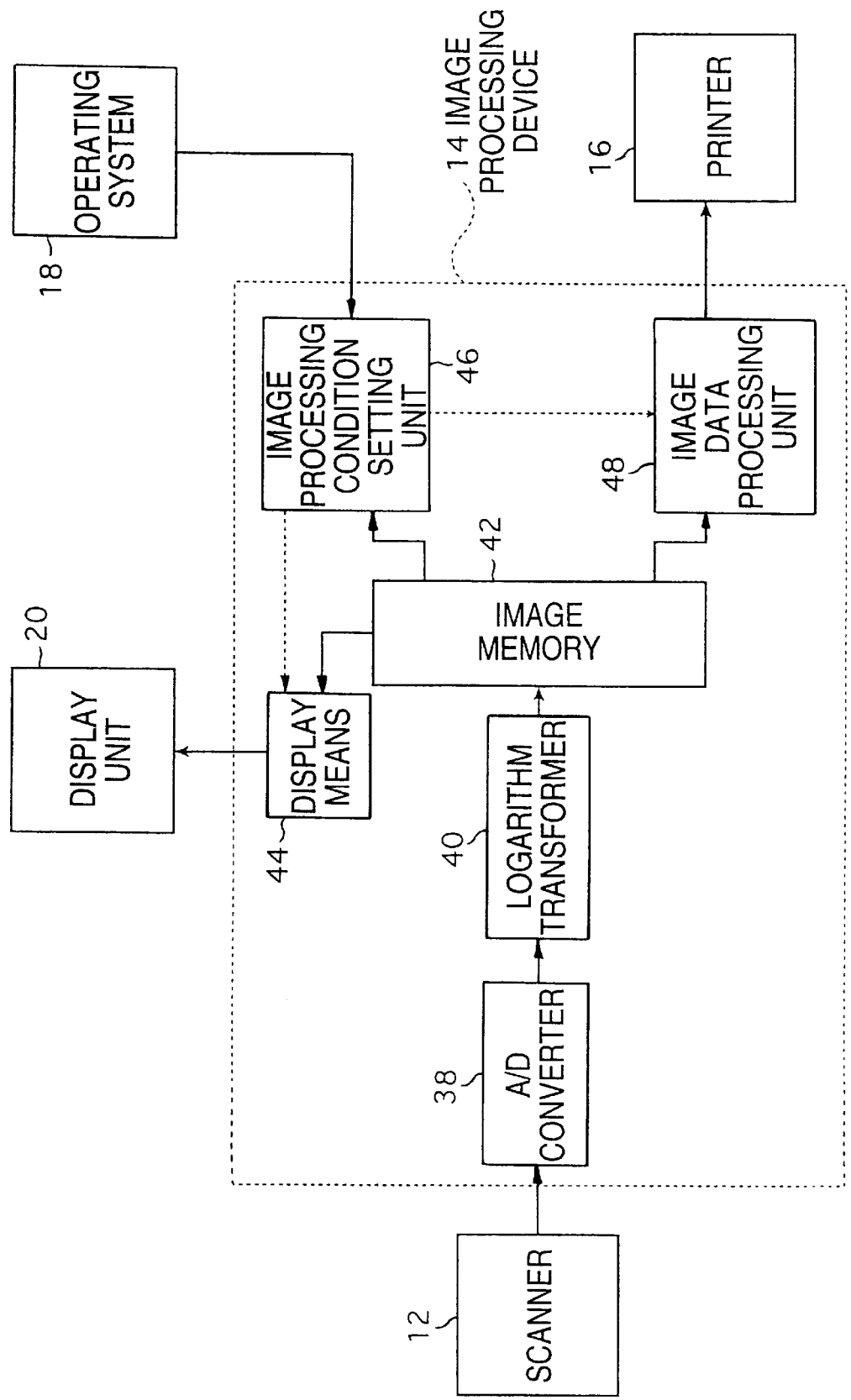
FIG. 2 is a block diagram showing an example of the image processing device of the digital photoprinter shown in FIG. 1.

As shown in FIG. 2, the processing device 14 includes an A/D converter 38, a logarithm transformer 40, an image memory 42, a display means 44, an image processing condition setting unit 46 (hereinafter, referred to as a setting unit 46) and an image data processing unit 48 (hereinafter, referred to as a data processing unit 48).

Although FIG. 2 shows only the components relating to the image processing, the processing device 14 also executes the operation, control, management and the like of the photoprinter 10 as a whole and is provided with a CPU for controlling and managing the entire photoprinter 10, a memory for storing information necessary to the operation and like of the photoprinter 10 as a whole, means for determining the stop value of the aforesaid variable stop 24 and the accumulation time of the CCD sensor 34, and the like which are disposed thereto in addition to the components shown in the drawing. Further, the operating system 18 and the display unit 20 are connected to these respective components through the CPU and the like (CPU bus). The processing device 14 is ordinarily composed of a computer or a workstation.

The respective R, G, B signals (image data) output from the scanner 12 are converted into digital image data by the A/D converter 38, subjected to logarithmic transformation by the logarithm transformer 40 and stored in the image memory 42.

The apparatus of the illustrated example is an apparatus for setting the image processing conditions in consideration of the characteristic value of the film F which is calculated from the image data obtained by successively reading the images of a plurality of frames (for example, six frames) using the scanner 12. The image memory 42 is a frame memory capable of storing the image data of the six frames in correspondence with the image processing conditions.

The image data may be subjected to various corrections such as DC offset correction, dark correction, shading correction and the like when necessary in the process from the A/D converter 38 to the image memory 42.

The number of frames to be successively read is not particularly limited and all the frames of the film F may be successively read when the image memory 42 has a sufficient capacity. Otherwise, when the characteristic value of the film F can be properly determined by the setting unit 46 which will be described later, the frames to be successively read may be two frames.

Since image data of at least six frames is ordinarily necessary to properly determine the characteristic value of the film F, it is preferable that the number of frames to be successively read is six or more.

Since the image reading apparatus of the illustrated example is an apparatus for determining the image processing conditions from the image data obtained by reading the image to be output, it is provided with the one set of the image memory 42. However, when the image reading apparatus of the present invention is also used as an apparatus for executing the prescanning, it may be provided with a separate memory for storing prescanned image data.

The setting unit 46 reads the image data stored in the image memory 42 successively or at a time by thinning it out and creates a density histogram (film density) for each frame.

Subsequently, the maximum density (shadow) and the minimum density (highlight) of the image of each frame recorded on the film F are determined by means of the density histogram. Further, the setting unit 46 determines the characteristic value of the film F using the shadow and highlight of the plurality of frames (six frames in the illustrated example).

Although the characteristic value of the film is determined by means of the average density value in the conventional image processing as described above, the average density value has a problem in that it cannot determine the characteristic value of the film with pinpoint accuracy because it is liable to be affected by the color failure.

In contrast, the highlight and shadow (namely, white and black) of an image is difficult to be affected by the color failure. Accordingly, the use of the highlight and shadow permits the characteristic value of the film to be determined without being affected by the color failure. In addition, accuracy can be improved by means of the image data of the plurality of frames because the dispersions of the highlight and shadow of the respective frames can be canceled by it.

Therefore, according to the image reading apparatus of the present invention, since the characteristic value of the film F can be determined with pinpoint accuracy from the image data of the plurality of frames, an image of high quality can be stably recorded by determining proper image processing conditions using the characteristic value.

The method of determining the highlight and shadow of each image by means of the density histogram is not particularly limited and various types of known methods may be used.

For example, there is exemplified a method arranged such that when a side of the film F where image data is small (the output from the CCD sensor 34 is weak) has a high density on the film F (a low density on a print), a specific point on the side where the cumulative frequency of the density histogram is low (for example, the point where the cumulative frequency is 1%) is set as shadow and a specific point on the side where it is high (for example, the point where the cumulative frequency is 99%) is set as highlight. There is also exemplified a method of determining the highlight after highly saturated color is removed as a method having higher pinpoint accuracy.

Further, there is exemplified a method of approximating the relationship among R, G and B of the highlight and shadow by means of the method of least squares as a method of determining the characteristic value of the film F using the highlight and shadow of the images of a plurality of frames.

More specifically, since the G density causes the most standard color formation in the design of an ordinary negative film, the characteristic value of the film F is determined in such a manner that the relationship between G density and R density and/or between G density and B density, for example, is determined as to the highlight and shadow of the images of a plurality of frames recorded on the film F and the relationship is approximated to a linear function using the method of least squares.

The characteristic value of the film F may be independently determined for every six frames which are read successively (successive reading unit), the characteristic value may be updated using the characteristic values up to the last time and the image data of new six frames or the characteristic value of the film F may be determined from all the data available each time six frames are read by storing the data necessary to determine the characteristic values of the film up to that time.

When the characteristic value of the film F is determined as described above, the setting unit 46 determines the image processing conditions, for example, a color balance adjusting condition, a density correction condition and a gradation (under/over) correction condition for each frame from the characteristic value of the film F and the image data (image characteristic amount) of each frame and sets the conditions to the data processing unit 48.

A method of determining the condition for adjusting the color balance making use of the characteristic of the film F will be exemplified as described below.

More specifically, when it is determined by means of the highlight and shadow of the image of the film F that both the highlight and shadow have a similar dislocation with respect to the characteristic value of the film F, since it is conceived that an image density causes a parallel dislocation due to the kinds of light sources such as a fluorescent light, strobe flash used in photographing and the like, the amount of dislocation is corrected.

On the contrary, when the highlight and the shadow have a different dislocation with reference to the characteristic value of the film F, that is, when only the highlight is dislocated, only the shadow is dislocated or both of them are differently dislocated, the color balance is not adjusted because it is conceived that failure arises.

Various kinds of known methods which have been conventionally executed can be used to determine the density correcting condition and, for example, a method of using a LATD (large area transmitting density) and the like are exemplified.

The gradation correcting condition, namely, the under and over correcting condition is determined from the information as to the point from which the highlight and shadow of a particular image is caused with respect to the highlight and shadow of the images of a plurality of frames, for example, the images of six frames from which the characteristic value of the film F is calculated and the dynamic range "(highlight) −(shadow)" of the particular image.

Figure 3:
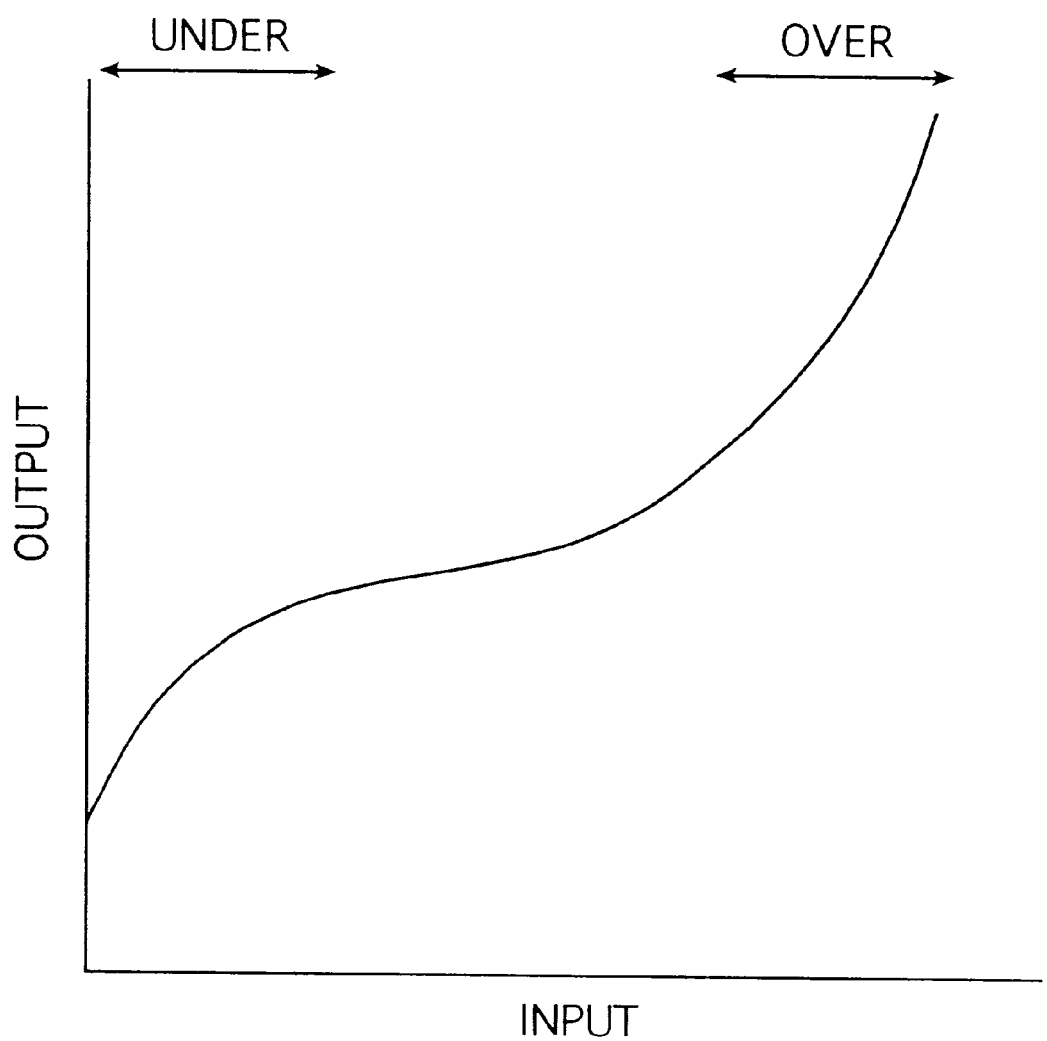
FIG. 3 is a graph showing a basic gradation correction curve set to the image processing device shown in FIG. 2.

More specifically, when the highlight and shadow of the image are located on a low density side and the dynamic range thereof is narrower than a regulated value which is determined suitably, it is determined that the image is under and the gradation correcting condition of the image is determined in such a manner that the side of a gradation correcting curve (function) serving as a reference shown in FIG. 3 where an image data value is small (under side) is corrected so as to stand up (extend) in accordance with the highlight and shadow and the dynamic range.

On the contrary, when the highlight and shadow of the image is located on a high density side and the dynamic range is narrower than the regulated value, it is determined that the image is over and the gradation correcting condition of the image is determined in such a manner that the side of the gradation correcting curve (function) serving as the reference where the image data value is large (over side) is corrected so as to stand up (extend) in accordance with the dynamic range and the like.

When the image is not inspected, the image processing conditions are settled by the above process, whereas when the image is inspected, the image processing conditions are changed in accordance with the color and density adjustment executed by the operator and the image processing conditions are settled at the time the image passes the inspection, which will be described later in detail in the description of operation.

The data processing unit 48 successively reads out the image data of the respective frames from the image memory 42, subjects the image data to specific image processing, namely, color balance adjustment, density correction and gradation correction in accordance with the settled image processing conditions and outputs the image data to the printer 16 as the recording image data.

In the image reading apparatus of the present invention, the recording image data may be supplied to the drive of various types of a recording medium such as a floppy disc, MO (magneto-optical recording medium) or the like which is connected to or accommodated in the processing device 14 or the like and stored in the recording medium.

When the image is inspected, the display means 44 reads out the image data of each frame from the image memory 42 by being thinned out and subjects the image data to image processing similar to that executed by the data processing unit 48 and displays the thus processed image data on the display unit 20.

The image reading apparatus of the present invention will be described below in more detail by the description of operation of the scanner 12 and the processing device 14.

When a print is made by the photoprinter 10, the operator sets a carrier corresponding to the film F serving as an original to the scanner 12 and makes necessary indications using the mouse 18b and the like.

On the other hand, when the operator sets the film F at the specific position of the scanner 12 (carrier) after he confirms that the quantity of light of the light source 22 of the scanner 12, and the like are set to specific conditions in the photoprinter 10, the first frame of the film F is conveyed to a specific reading position by the carrier.

When it is indicated to start reading, the previous reading is carried out prior to the reading of the image to be output, as described above.

When the previous reading is carried out, the stop value of the variable stop 24 and the accumulation time of the CCD sensor 34 are in initial states which are set to the scanner 12 in accordance with the type of the film F. The reading light emitted from the light source 22 is toned by a filter, for example, the G filter of the color filter plate 26 inserted into the light passage L with its quantity of light adjusted by the variable stop 24 and applied to and passes through the first frame of the film F to thereby obtain the projected light carrying the image (G image) recorded on the first frame.

The projected light is further projected onto the CCD sensor 34 within the effective pixel region thereof by the imaging lens unit 32, the G image of the film F is read, amplified by the amplifier 36, subjected to A/D conversion by the A/D converter 38 and to logarithmic transformation by the logarithm transformer 40 and stored in the image memory 42. Upon completion of the reading of the G image, the B image and then the R image, for example, are read likewise and successively stored in the image memory 42.

The image data is read out to the determination means provided with the processing device 14 for determining the stop value of the variable stop 24 and the accumulation time of the CCD sensor 34 so that the reading conditions for reading the image to be output are determined and the adjustment of the variable stop 24, and the like is carried out.

Upon completion of the adjustment of the variable stop 24 and the like, the image to be output is read. The reading of the output image is essentially carried out likewise the previous reading except that the stop value of the variable stop 24, the accumulation time of the CCD sensor 34, the resolution and the like are different therein from those in the previous reading and the G image, B image and R image of the first frame of the film F are successively read and supplied to the processing device 14.

The image data of the G image, B image and R image obtained by reading the output image is subjected to A/D conversion by the A/D converter 38 and to logarithmic transformation by the logarithm transformer 40 and successively stored in the image memory 42 likewise, by which the reading of the image of the first frame is completed.

Upon completion of the image reading of the first frame, the carrier mounted on the scanner 12 conveys the film F by one frame so that the second frame is conveyed to the reading position and the image of the second frame is read likewise (both the previous reading and the reading of the image to be output) and stored in the image memory 42. Thereafter, the images of up to the sixth frame are read likewise and the image data of six frames are stored in the image memory 42.

Note, the successive reading of the images need not be carried out in the sequence of the frame numbers and may be carried out in the sequence indicated by the operator, or the like.

Simultaneously with the reading of the images, the setting unit 46 successively reads out the image data stored in the image memory 42 by thinning it out and creates the density histogram of each frame and further determines the highlight and shadow of each frame using the density histogram.

When the highlights and shadows of all the six frames are determined, the setting unit 46 determines the characteristic value of the film F by making the relationship between the G density and R density of them to a linear function by approximating the relationship to it by means of the method of least squares, as described above.

When the characteristic value of the film F is determined, the setting unit 46 then determines the color balance adjusting condition, density correcting condition and gradation correcting condition for each frame using the characteristic value of the film F and the image characteristic amount (the highlight and shadow, LATD, dynamic range and the like) of each frame as described above.

When the image is not inspected (in a job mode in which inspection is not carried out by the monitor), the setting unit 46 successively sets the determined image processing conditions to the data processing unit 48 to thereby settle the image processing conditions.

Simultaneously with the setting of the image processing conditions executed by the setting unit 46, the data processing unit 48 successively reads out the image data of the frames to which the image processing conditions are set from the image memory 42, adjusts the color balance and corrects the density and gradation in accordance with the above set image processing conditions and outputs the image data to the printer 16 as the recording image data.

Whereas, when the inspection of the image is carried out (in a job mode in which inspection is carried out by the monitor), the setting unit 46 determines the image processing conditions of all the frames and then sets the image processing conditions to the display means 44 and the data processing unit 48.

Subsequently, the display means 44 reads out the image data of all the frames from the image memory 42 by thinning it out it, processes the image data in accordance with the set image processing conditions and displays the images of the six frames on the display unit 20. Although the image of each frame may be displayed on the display unit 20, the display of the images of the plurality of frames permits the images of the front and rear frames to be compared and examined with each other, by which the inspection job can be easily carried out.

The operator carries out the inspection of the image of each frame by observing the image displayed on the display unit 20 and adjusts the gradation and color/density of the image through the operating system 18 when necessary. The image processing conditions set to the display means 44 and the data processing unit 48 are corrected in accordance with the adjustment and the image displayed on the display unit 20 is also changed accordingly.

When the operator determines that the image is proper (the image passes the inspection) and indicates to output the image, the image processing conditions are settled and, the data processing unit 48 successively reads out the image data from the image memory 42, carries out similar image processing in accordance with the settled image processing conditions and outputs the image data to the printer 16 as the recording image data. Note, the output indication may be issued for every one frame or to all the frames at a time.

When the image processing of the six frames are completed, the scanner 12 starts to read the images of the next six frames (the seventh frame to the twelfth frame in the example) likewise the aforesaid reading of the images.

Alternately, the reading of the images may be started at the time the image of one frame is read from the image memory 42, namely, at the time when a space is made available in the image memory 42.

As described above, the recording image data processed by the data processing unit 48 is essentially output to the printer 16.

The printer 16 includes, for example, a light source for emitting light beams corresponding to the respective exposures of R, G and B in accordance with the spectral sensitivity characteristics of a photosensitive material, light beam modulation means such as an AOM (acousto-optic modulator) or the like, a light deflector such as a polygon mirror or the like, an fθ lens, and the like and makes use of known light beam scan exposure. The printer 16 modulates the light beams in accordance with the image data supplied from the processing device 14 (data processing unit 48) and deflects the light beams in a main scanning direction as well as conveys the photosensitive material in an auxiliary scanning direction which is normal to the main scanning direction to thereby expose (print) the photosensitive material by the light beams carrying the image and form a latent image. Thereafter, the printer 16 subjects the photosensitive material to development processing and the like which correspond thereto and outputs a print (photograph) having reproduced the image recorded on the film.

Although the image reading apparatus of the present invention is described above in detail, it is needless to say that the present invention is not limited to the above embodiment and various improvements and modifications can be made without departing from the spirit and scope of the present invention.

As described above in detail, the image reading apparatus of the present invention includes the digital image reading apparatus for photoelectrically reading the image recorded on the film, subjects the image to the specific image processing and outputs it as the recording image data. Since the image reading apparatus can determine the characteristic value of the film with pinpoint accuracy without being affected by color failure and the like and can set image processing conditions for each frame using the characteristic value, the apparatus can stably output a print on which an image of high quality is recorded.

What is claimed is:

1. An image reading apparatus, comprising:
   a reading unit for photoelectrically reading images of a plurality of frames recorded on a film and outputting the images as image data of three primary colors; and
   a condition setting unit for creating density histograms of the images of said plurality of frames read by said reading unit, calculating a characteristic value of the film from the density histograms of the images of said plurality of frames and determining image processing conditions for an image of each frame from the characteristic value of the film and the image data of the image of each frame,
   wherein said condition setting unit calculates a characteristic value of the film by approximating by means of a method of least squares a relationship among the three primary colors of a specific point on a side where a cumulative frequency is low and a specific point on the side where the cumulative frequency is high which are obtained from the density histograms of the images of the respective frames.

2. The apparatus according to claim 1, wherein said specific point on the side where the cumulative frequency is low and said specific point on the side where the cumulative frequency is high are set as a shadow and a highlight of the images of the plurality of frames, respectively.

3. The apparatus according to claim 2, wherein said shadow and said highlight correspond to a maximum density and a minimum density, respectively.

4. The apparatus according to claim 1, wherein said relationship is approximated to a linear function.

5. The apparatus according to claim 1, wherein said three primary colors are a red color, a green color and a blue color.

6. The apparatus according to claim 1, wherein said characteristic value of the film is a base density of the film.

7. The apparatus according to claim 6, wherein said base density is expressed by the image data of the three primary colors.

8. The apparatus according to claim 1, wherein said condition setting unit determines a color balance adjusting condition as one of said image processing conditions by making use of the characteristic value of the film.

9. The image reading apparatus according to claim 1, further comprising:
   an image processing unit for processing the image data of the image of each frame in accordance with the image processing conditions of the image determined by said condition setting unit.

10. An image reading and processing method, comprising the steps of:
    reading photoelectrically images of a plurality of frames recorded on a film and outputting the images as image data of three primary colors;
    creating density histograms of the thus read images of said plurality of frames;
    calculating a characteristic value of the film from the density histograms of the images of said plurality of frames; and
    determining image processing conditions for an image of each frame from the characteristic value of the film and the image data of the image of each frame;
    wherein said characteristic value of the film is calculated by approximating a relationship among the three primary colors of a specific point on a side where a cumulative frequency is low and a specific point on the side where the cumulative frequency is high which are obtained from the density histograms of the images of the respective frames by means of a method of least squares.

11. The image reading and processing method according to claim 10, further comprising the step of:
    processing the image data of the image of each frame in accordance with the image processing conditions of the image.

12. The method according to claim 10, wherein said specific point on the side where the cumulative frequency is low and said specific point on the side where the cumulative frequency is high are set as a shadow and a highlight of the images of the plurality of frames, respectively.

13. The method according to claim 12, wherein said shadow and said highlight correspond to a maximum density and a minimum density, respectively.

14. The method according to claim 10, wherein said relationship is approximated to a linear function.

15. The method according to claim 10, wherein said three primary colors are a red color, a green color and a blue color.

16. The method according to claim 10, wherein said characteristic value of the film is a base density of the film.

17. The method according to claim 16, wherein said base density is expressed by the image data of the three primary colors.

18. The method according to claim 10, wherein a color balance adjusting condition is determined as one of said image processing conditions by making use of the characteristic value of the film.

* * * * *